United States Patent [19]
Bond et al.

[11] 3,931,070
[45] Jan. 6, 1976

[54] PLYWOOD ADHESIVE

[75] Inventors: Wayne H. Bond; Thomas J. Moehl, Albany, Oreg.

[73] Assignee: Georgia-Pacific Corporation, Portland, Oreg.

[22] Filed: Jan. 15, 1975

[21] Appl. No.: 541,082

[52] U.S. Cl. .............. 260/17.5; 156/335; 161/262; 260/963
[51] Int. Cl.$^2$ ......................................... C08L 97/02
[58] Field of Search ........... 260/17.5, 963; 161/262; 156/335

[56] References Cited
UNITED STATES PATENTS

| | | | |
|---|---|---|---|
| 2,395,375 | 2/1946 | Linzell | 162/116 X |
| 2,784,184 | 3/1957 | Zweidler et al. | 260/37 R X |
| 2,786,820 | 3/1957 | Uschmann | 260/37 R X |
| 2,849,314 | 8/1958 | Goss | 92/3 |
| 3,296,159 | 1/1967 | Lissner | 260/17.5 |
| 3,597,375 | 8/1971 | Ludwig et al. | 260/17.5 |
| 3,658,638 | 4/1972 | Ludwig et al. | 260/17.5 X |
| 3,677,884 | 7/1972 | Bornstein | 161/262 |

OTHER PUBLICATIONS

Skeist, Handbook of Adhesives (Van Nostrand, 1962).
Katz, Adhesive Mat's their Props. & Uses, (Foster, 1964).
Kosolapoff, Organophosphorus Cpds., (Wiley, 1950).
Van Wazer, Phosphorus & Its Cpds., (Interscience, 1958).
Chem. Abs., 75:P153129x.
Julius Benko, in TAPPI, 44, No. 12, 849–854, (Dec. 1961).

*Primary Examiner*—Murray Tillman
*Assistant Examiner*—T. De Benedictis, Sr.
*Attorney, Agent, or Firm*—Peter P. Chevis

[57] ABSTRACT

A phenolic plywood adhesive containing lignosulfonates and a trialkyl phosphate having alkyl substituents of from 1 to 6 carbon atoms for use in a curtain coater is described.

10 Claims, No Drawings

PLYWOOD ADHESIVE

This invention pertains to a plywood adhesive. More particularly, it pertains to phenol-formaldehyde plywood adhesives to which lignosulfonate has been added to improve the curtainability of the adhesives.

Adhesives for plywood preparation must have a certain working characteristic in addition to the proper adhesive properties for satisfactory performance under modern production methods. The production methods vary to a considerable extent such that generally the adhesives must be tailored for the particular process in order to achieve the high-speed production desired. For example, curtain coaters have certain advantages under particular conditions over other methods employed and are often used for application of adhesives to veneers. Since in this method of application the adhesive is applied by passage through a uniform slit of controlled size, the adhesive must have properties and characteristics which are mainly unique to this method of application. In addition to the viscosity characteristics, the adhesive must have good film-forming and other surface properties in order to evenly and uniformly coat the veneer. Since plywood adhesives usually contain amylaceous and/or proteinaceous extenders and fillers, the presence of the amylaceous or proteinaceous materials generally affect the surface properties of the adhesive making the application of the adhesive by a curtain coater difficult.

It is, therefore, an object of this invention to provide a phenol-formaldehyde resin plywood adhesive especially effective for curtain coaters. A further object is to provide a process for a preparation of an adhesive containing amylaceous or proteinaceous materials which are especially effective for use in curtain coaters. A still further object is to provide a process for the preparation of plywood using an adhesive of enhanced curtainability in a curtain coater. A still further object is to provide a process for enhancing the curtainability of the phenol-formaldehyde resin adhesives.

The above and other objects are obtained by adding, based upon the weight of the phenol-formaldehyde resin in the adhesive, at least 1 percent of a sodium lignosulfonate and from 0.05 to 1 percent of a trialkyl phosphate having alkyl substituents having from 1 to 6 carbon atoms. The addition of the alkyl phosphate and lignosulfonate to the phenol-formaldehyde adhesive containing extenders and fillers, especially amylaceous or proteinaceous materials, modifies the surface properties of the phenolic adhesive mixture enhancing the curtainability or film-forming properties to give even, uniform coating of the adhesive on the veneer.

Lignosulfonates have adhesive characteristics to a limited extent and numerous publications teach using lignosulfonate as an adhesive or the addition of lignosulfonates to adhesives such as phenolic adhesives, as an extender or a replacement of a resin constituent. In U.S. Pat. No. 2,849,314 lignosulfonate is treated with ammonia and then reacted with an aldehyde, an amine, or a hydroxy aromatic compound to obtain a thermosetting resin. U.S. Pat. Nos. 2,786,820 and 3,296,159 likewise disclose a reaction of lignin with aldehyde in preparation of water soluble thermosetting adducts which may be used as adhesives or added to phenol-formaldehyde adhesives. Using lignosulfonate to replace a portion of the phenol in preparation of phenolic adhesives is taught in U.S. Pat. Nos. 2,395,375 and 3,658,638. Different molecular weight lignosulfonate were also used as extenders in phenolic adhesives as reported by Julius Benko in Volume 44, No. 12 pages 849–854 of the TAPPI (December, 1961) published by the Technical Association of the Paper and Pulp Industry. Further, water insoluble lignin are commonly added as fillers in phenolformaldehyde plywood adhesives. However most of the work has been directed toward trying to utilize the lignosulfonate as an adhesive or to use a lignosulfonate to replace a portion of the phenolic resins and not to use a lignosulfonate to modify the surface properties of the adhesive such as to enhance the curtainability of the mixture.

Lignin is a polymeric substance of substituted aromatics found in plant and vegetable tissue associated with cellulose and other plant constituents. While there is some variation in the chemical structure and of other constituents found in the plant, depending upon the type of plant, place where the plant is grown, and also upon the method used in recovery or isolation of the particular constituents from plant tissue, the basic structure and properties of these materials are similar and upon sulfonation form a well-known group of materials referred to as "lignosulfonate" or "sulfonated lignin." The reactions and properties of lignosulfonates and lignin are covered in the text, *The Chemistry of Lignin* by F. E. Brauns et al, Academic Press, New York, New York (1960).

One of the main sources of sulfonated lignin is the residual pulping liquors obtained in pulp and paper industry where lignocellulosic materials such as wood, straw, corn stalks, baggasse, and the like are processed by well known methods to recover the cellulose or pulp. In the sulfite pulping process, lignocellulosic material is digested with a sulfite or bi-sulfite to sulfonate the lignin and obtain a residual product commonly referred to as "spent sulfite liquor" containing the sulfonated lignin. In other processes the residual pulping liquor or lignin as obtained from the process may not be a sulfonated product. However, the residual liquors or products containing the lignin portion may be sulfonated by the various known methods to the degree desired.

Spent sulfite liquor or other sulfonated lignin products obtained upon sulfonation of residual pulping liquors generally contain other constituents besides sulfonated lignin or lignosulfonates. The products may contain carbohydrates, degradation products of carbohydrate, and resinous materials as well as other organic and inorganic constituents. Although these non-lignin constituents may be removed it is not necessary to do so. Further, the lignosulfonates or products containing the lignosulfonates may be subjected to different treatment such as for example acid treatment, alkaline or heat treatment, oxidation or fermentation to remove or modify some of the non-lignin constituents or for other purposes. Generally, the basic phenylpropane polymeric structure of the lignin constituents and properties and characteristics of these products are not destroyed unless the treatment is unusually severe. In addition, the treated or non-treated products may be fractionated to obtain a particular lignosulfonated fraction or polymerized to increase the molecular weight. The high molecular weight lignosulfonates remain operative as long as they are water soluble and the molecular weight has not been increased to the extent that the product becomes a flocculent which is well known.

A lignosulfonate is usually added to the phenol-formaldehyde resin in an amount of from 1 percent of the weight of the phenol-formaldehyde resin in the adhesive to about 10 percent. Preferably the amount used is between 3 to 6 percent. While larger additions of the lignosulfonate may be made, increase in the lignosulfonate content above 6 percent does not appreciably enhance the curtainability. However, the amount of lignosulfonate used may be increased up to 20 to 30 percent or higher with the higher concentrations being used mainly to obtain other characteristics or for other purposes in addition to improving the curtainability.

In the addition of the lignosulfonate to the adhesive, generally it is preferred to intermix the lignosulfonate with the phenol and aldehyde during condensation of the phenol with the aldehyde in the resin preparation or adding it to the phenol-aldehyde resin at the end of the resin preparation. The lignosulfonate however may also be added at the time the adhesive is being prepared by intermixing the phenol-formaldehyde resin with the various constituents used in the adhesive mixture. Whether the lignosulfonate is added to the phenol-formaldehyde resin during condensation or mixed with the constituents in the preparation of the adhesive, the same methods and procedures presently used for condensation of phenol with formaldehyde in preparationn of resins for plywood adhesives are employed as well as procedures for preparation of the adhesive. Generally one to three equivalents of aldehyde per mole equivalent of phenol are employed with a ratio of 1.6 to 2.5 moles of formaldehyde per mole of phenol being preferred. The mixture is heated usually under alkaline conditions until sufficient condensation between the phenol and aldehyde has been obtained to obtain the desired viscosity for the particular situation.

The alkyl phosphate is generally added during the mixing of the constituents in the preparation of the adhesive. The order of addition is not critical and may be added at the beginning of the formulation or near the end. The trialkyl phosphates having alkyl substituents of from 1 to 6 carbon atoms may be used, but tributyl phosphate which is most readily available is preferred. Tributyl phosphate has been used in phenol-formaldehyde resins as a surfactant and also functions in this capacity when intermixed in the presence of the lignosulfonate. The amount added may be widely varied but is generally in a range of 0.05 to 1 percent, based upon the weight of the phenol-formaldehyde resin, with from 0.25 to 0.75 percent being preferred. The addition of other surfactants, such as for example a non-ionic polyoxyalkalene-alkylphenol may also be used with a smaller amount of the alkyl phosphate. The addition of these non-ionic surfactants may in many situations further enhance the curtainability of the mixture.

To further illustrate the invention, a phenol-formaldehyde adhesive was prepared and the surface tension of the mixture was determined upon addition of lignosulfonate and various amounts of tributyl phosphate.

It was found that a correlation could be obtained between the curtainability and surface tension of the adhesive mixture with the curtainability improving with lower surface tension values.

The phenol-formaldehyde resin adhesive was prepared by intermixing 400 grams of hydrolysis lignin filler, sold under the trademark of NORPROFIL and 150 grams of wheat flour in 900 grams of water. To this mixture, 2300 grams of an aqueous solution of phenol-formaldehyde resin containing 40 percent phenol-formaldehyde resin with 135 grams of 50 percent caustic and 2 grams of borax were added. The surface tension of the adhesive mixture as prepared above was determined and found to be 69.7 ergs per square centimeter. When tributyl phosphate was added to the above adhesive in an amount of 0.5 percent of the weight of the phenol-formaldehyde resin, the surface tension decreased to 68.4 ergs per cubic centimeter. The base adhesive as well as the one to which the tributyl phosphate was added were unsatisfactory for use in a curtain coater.

An adhesive was prepared in a manner similar to that above except that in preparation of the phenol-formaldehyde resin, a sodium base lignosulfonate was added in an amount of about 5.4 percent of the lignosulfonate to the phenol and formaldehyde mixture prior to condensation of the phenol with the formaldehyde in preparation of the resin.

The surface tension of the adhesive prepared from the phenol-formaldehyde resin containing the lignosulfonate was 66.8 ergs per square centimeter. To samples of this adhesive, tributyl phosphate was added in an amount of 0.1, 0.2, and 0.5 percent of the phenol-formaldehyde resin present in the adhesive. The surface tension of the samples containing the tributyl phosphate was 60.4, 58.1, and 50.2 ergs per square centimeter, respectively.

What is claimed is:

1. In a process of applying a phenol-formaldehyde resin adhesive containing amylaceous or proteinaceous materials to plywood veneer using a curtain coater, the improvement which comprises adding at least 1 percent, based upon the weight of the phenol-formaldehyde resin in said adhesive, of a sodium base lignosulfonate and from 0.05 to 1 percent, based upon the weight of the phenol-formaldehyde resin, of a trialkyl phosphate having alkyl substituents of from 1 to 6 carbon atoms.

2. A process according to claim 1 wherein the trialkyl phosphate is tributyl phosphate.

3. A process according to claim 1 wherein a sodium base lignosulfonate is added in an amount of from 3 to 6 weight percent.

4. A process according to claim 1 wherein the trialkyl phosphate is tributyl phosphate and is added in an amount of from 0.25 to 0.75 percent.

5. A process according to claim 1 wherein the sodium lignosulfonate is added to the phenol and formaldehyde mixture during the condensation of the phenol with the formaldehyde in the preparation of the phenol-formaldehyde resin.

6. A process according to claim 5 wherein the lignosulfonate is added in an amount of from 3 to 6 weight percent and the trialkyl phosphate is tributyl phosphate added in an amount of from 0.25 to 0.75 percent.

7. A process according to claim 6 wherein the sodium base lignosulfonate is a sodium base spent sulfite liquor.

8. A process according to claim 7 wherein the phenol-formaldehyde resin is condensed in a mole ratio of 1.6 to 2.5 moles of formaldehyde per mole of phenol.

9. In a phenol-formaldehyde plywood adhesive containing amylaceous or proteinaceous materials to plywood veneer using a curtain coater, the improvement which comprises adding at least 1 percent, based upon the weight of the phenol-formaldehyde resin in said adhesive, of a sodium base lignosulfonate and from 0.05 to 1 percent, based upon the weight of the phenolformaldehyde resin, of a trialkyl phosphate having alkyl substituents of from 1 to 6 carbon atoms.

10. An adhesive composition according to claim 9 wherein the sodium base lignosulfonate is added in an amount of 3 to 6 weight percent to the phenol and formaldehyde mixture during the condensation of the phenol with formaldehyde in the preparation of the phenol-formaldehyde resin and the trialkyl phosphate is tributyl phosphate added in an amount of 0.25 to 0.75 percent.

* * * * *